L. J. GOODSPEED.
WHEEL.
APPLICATION FILED JAN. 25, 1909.

929,208.

Patented July 27, 1909.

Witnesses:
L. E. Waterman
E. Behel.

Inventor:
Leonard J. Goodspeed
by A. O. Behel
Attorney

UNITED STATES PATENT OFFICE.

LEONARD J. GOODSPEED, OF ROCKFORD, ILLINOIS.

WHEEL.

No. 929,208.      Specification of Letters Patent.      Patented July 27, 1909.

Application filed January 25, 1909. Serial No. 474,084.

*To all whom it may concern:*

Be it known that I, LEONARD J. GOODSPEED, a citizen of the United States, residing at Rockford, in the county of Winnebago and State of Illinois, have invented certain new and useful Improvements in Wheels, of which the following is a specification.

The object of this invention is to quickly and securely set a tire in a manner to prevent the accumulation of rust, moisture and dirt between the tire and felly of a wheel which produces a wheel, having an elastic oiled cushion between the tire and felly.

Figure 1:
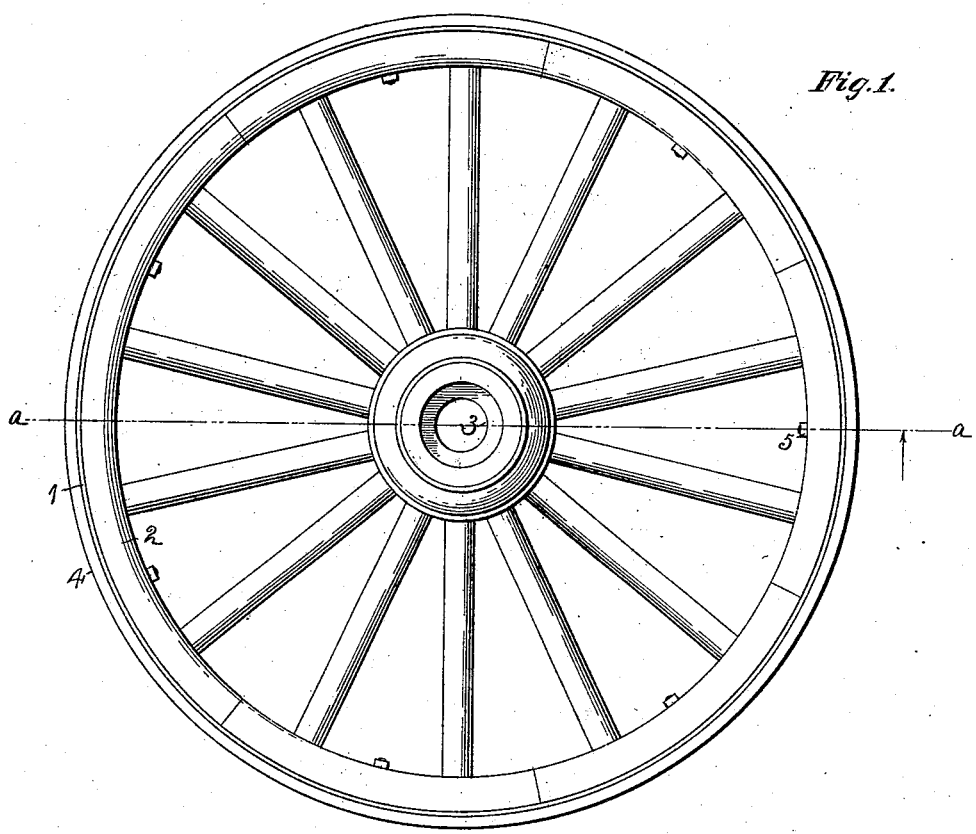
Figure 2:
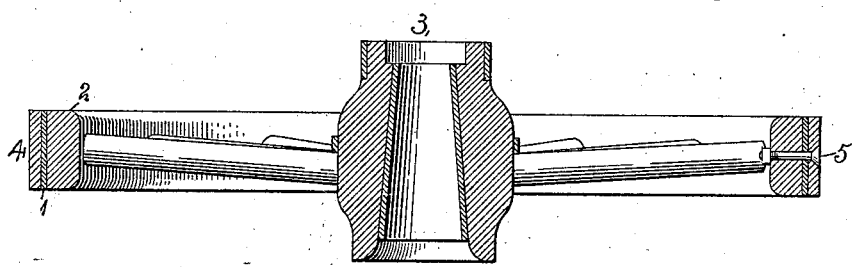

In the accompanying drawings, Figure 1 is a wheel in which the tire has been set by my improved method. Fig. 2 is a transverse section through the felly, fabric material and tire of a wheel, the tire of which has been set by my improved method, on dotted line *a a* Fig. 1.

It has been found when tires have been set to the felly of a wheel simply by heating the tire and allowing it to shrink on the felly, that moisture will gather between the tire and felly, thereby causing the tire to rust which will loosen and fall out, thereby creating a space in which moisture and dirt will gather causing rust to increase to an extent that the tire becomes loosened sufficiently to rattle when it must be reset. In resetting a tire it has been necessary to employ the services of a blacksmith who will shorten the tire sufficiently to make a close fit with the felly when in place thereon. By the employment of my method, the owner of the vehicle can readily set his own tires, which, when set will wear much longer than when set in the ordinary manner, and my improved method can be employed in setting the tires on new wheels, and can also be employed to set the rims when rubber tires are employed.

My method of setting tires consists in placing a strip of fabric 1 on the face of the felly 2 of a wheel 3, then saturating it with raw linseed oil. The tire 4 is heated which will expand sufficiently to allow it to be placed over the fabric 1. Bolts 5 connect the parts in the usual manner. The tire when contracting, and while yet hot will heat the oil in the fabric sufficiently to cause it to penetrate the wood of the felly sufficiently to form a solid union between the fabric and felly. Sufficient oil will remain in the fabric to cause a close fitting union between the fabric and tire. When the tire is cold, the oil in the fabric will become semi-hard or gumming, so that it will constitute a binding agent between the felly and fabric and between the fabric and tire, while said fabric will form a cushion between the tire and felly.

By the employment of oiled fabric between the tire and felly, a union will be formed between the tire and felly which will yield under the pressure of the weight on the wheel without opening up crevices between the tire and fabric which would admit dirt and moisture. As moisture cannot gain access between the tire and fabric, rust will not form there-between, consequently the tire will not rattle loose as quickly as when set in the ordinary manner. Any farmer or other person can readily set his own tires, thereby creating a great saving.

While I have specified raw linseed oil, I deem it the best, but other oils might be used with good results, therefore I wish to include all such oils within the scope of my invention.

While I have stated that oil is applied to the fabric after the fabric is in place on the felly, it is evident that the fabric might be saturated with oil before the fabric is placed on the felly, and in the claim the expression "oiled material" is intended to cover both of these applications.

I claim as my invention.

A wheel comprising a wooden felly, a tire or rim thereon and a strip of oiled material interposed between the felly and tire or rim, said oiled strip constituting means for excluding moisture and dirt from between the felly and tire or rim, and the oil from said strip entering the wooden felly.

In testimony whereof I have hereunto set my hand in presence of two subscribing witnesses.

LEONARD J. GOODSPEED.

Witnesses:
    A. O. BEHEL,
    E. D. E. N. BEHEL.